Patented Oct. 20, 1931

1,827,757

UNITED STATES PATENT OFFICE

THEODORE L. MASTERSON, OF BUFFALO, NEW YORK, ASSIGNOR TO NATIONAL ANILINE & CHEMICAL CO., INC., OF NEW YORK, N. Y., A CORPORATION OF NEW YORK

INDIGO POWDER AND METHOD OF MAKING THE SAME

No Drawing.    Application filed June 4, 1925.   Serial No. 35,018.

The present invention relates to the production of indigo in a dry form, and more particularly in the form of a dry powder having special and desirable properties.

Synthetic indigo is frequently shipped in the form of a twenty percent paste but where the product is to be forwarded for long distances it is more advantageous to ship it in a dry state in the form of a cake or powder. When once the indigo has been dried, however, it does not rewet readily with water and is difficult to disperse in water in order to allow uniform reduction to form a vat.

Indigo paste when dried in the ordinary way to a powder and then added to water with hand stirring gives a pasty mass containing varying amounts of partially wetted lumps. These lumps can only be disintegrated into a fairly smooth paste by very thorough agitation or grinding in some apparatus such as a ball mill, which is usually not available to the ordinary dyer. If the wetted powder containing these lumps is added to a fermentation vat of the type often used to reduce indigo to the leuco form before application to the fiber, many of the unwetted lumps sink to the bottom of the vat and are only reduced with difficulty, or not at all, by the bacterial action in the vat. This causes a loss of indigo and trouble to the dyer in producing the desired shade on the fiber. A powder, therefore, which wets readily with water and disperses into the vat readily so that no large unwetted lumps settle out is very desirable and enables the dyer to use more easily, economically, and efficiently an indigo powder rather than a paste.

It has been heretofore proposed to convert indigo into a wettable powder by treatment with sulfuric acid. This product pastes readily but the process is expensive and the physical appearance of the product is changed as it takes on a reddish blue bronzy appearance instead of the blue of the dried nontreated product.

The present invention has for its object the production of an improved dry, blue indigo powder which wets readily with water, disperses readily and evenly throughout the water, and remains evenly suspended for sufficient time to allow ample reduction in a vat to the leuco form. It can be shown that the acid treatment of indigo mentioned above causes the indigo to have slightly inferior dyeing properties, giving dyeings which are greener and duller in shade than the untreated synthetic indigo. The present invention avoids this and the dyeings of the resulting powder are as bright and substantially of the same shade as those of the original, untreated paste. The final indigo powder is preferably limited in size or fineness to such as will pass through screens having about 40 meshes to the linear inch but be retained upon a screen having about 100 meshes to the linear inch.

The production of this powder according to the present invention may be carried out as follows:

(a) The indigo paste, washed until nearly neutral, may be compressed before or during drying to form a final product which when disintegrated will form a powder which will wet readily with water.

(b) The indigo paste may be mixed with a suitable agent, capable of improving the wetting qualities of the indigo, and then dried and disintegrated.

(c) The first two methods may be combined.

The first method (a) may be accomplished by pressing the paste in a hydraulic press and subsequently drying in a suitable dryer the resulting cake. Or the paste may be dried in a rotary vacuum or rotary atmospheric dryer by which operation the paste is compacted and compressed to a dry product of greater apparent density than that dried in a shelf dryer. When properly disintegrated, the indigo thus obtained will form a powder of good wetting properties.

As suitable agents employed in the second method (b), I may use carbohydrates such as starch, dextrine, etc., monohydric alcohols such as methyl and ethyl alcohol, polyhydric alcohols such as ethylene glycol and glycerine, soaps as for example olive oil soap, palm oil soap, etc., oils such as corn oil and sulfonated oils such as Turkey red oil and other sulfonated vegetable oils. A single agent may be used or a mixture of several such agents may be employed. For the purpose of this invention, such agents are known as wetting or dispersing agents.

The following specific examples will further illustrate the invention, but it will be understood that the invention is not limited to the details set forth therein.

Example 1.—An indigo paste containing not more than 0.5 percent alkali or acid, calculated respectively as caustic soda or sulfuric acid, is mixed with about 1 percent of Turkey red oil based on the dry weight of indigo. The product is then dried in a rotary vacuum drier until substantially free from water. It is ground or sifted. The product is a blue indigo powder which wets readily and can be easily dispersed in water.

Example 2.—An indigo paste which is substantially neutral, containing less than 0.5 percent alkali or acid, is mixed with about 1 percent of olive oil soap, based on the dry weight of the indigo, and the mixture is formed into cakes or pellets in a hydraulic press and dried in an atmospheric or vacuum shelf dryer to substantial dryness. The product, after conversion to a powder, readily wets and disperses in water.

Example 3.—An indigo paste, which is substantially neutral and containing not more than 0.5 percent of alkali or acid, is dried in a rotary vacuum dryer until substantially free from water. It is then milled or sifted. This method of operation compacts the indigo into an apparently dense form which wets with water much more readily than does the product obtained by drying the paste without subjecting it to a compacting operation, for example, by drying it in an ordinary shelf oven. The product is a blue cake which can be easily broken up into a powder which wets readily with water.

Example 4.—An indigo paste which is substantially neutral, containing not more than 0.5 percent of alkali or acid, is mixed with 1 percent of Turkey red oil, based on the dry weight of the indigo. The paste is then dried in an atmospheric shelf dryer until substantially free from water. The product is ground or sifted and gives a blue powder which wets readily and can be easily dispersed in water.

It will be thus seen that the present invention makes possible the production of a dry indigo product which retains substantially its original blue color and dyeing properties, and being capable of ready wetting and of dispersion in water. The product does not possess a coppery or bronze-like lustre.

I claim:

1. A process of preparing a dry indigo dyestuff, capable of being readily wetted and dispersed in water, which comprises mixing a small amount of Turkey red oil with an indigo paste and drying to substantial dryness.

2. A process of preparing a dry indigo dyestuff, capable of being readily wetted and dispersed in water, which comprises mixing about one percent of Turkey red oil with an indigo paste and drying to substantial dryness.

3. A process of improving the wetting qualities of indigo as a powder which comprises admixing a substantially neutral indigo paste with about one percent of its dry weight of Turkey red oil, drying the product in a vacuum to substantial dryness, and subsequently grinding the product to a powder.

4. A process of preparing a dry indigo powder which comprises mixing indigo paste with a small amount of Turkey red oil and drying the product to substantial dryness while it is being subjected to a compacting action.

5. A process of improving the wetting qualities of indigo which comprises drying indigo paste while being subjected to a compacting action.

6. A dry indigo dyestuff comprising an indigo dyestuff associated with a small amount of Turkey red oil.

7. A dry indigo dyestuff comprising an indigo dyestuff associated with about one percent of Turkey red oil.

8. As a new product, a powder comprising indigo associated with a sulfonated oil, said powder being readily wetted and dispersed in water.

9. A process of preparing a dry indigo dyestuff which comprises admixing a sulfonated oil with an indigo dyestuff paste and drying the mixture to substantial dryness.

10. A process of preparing a dye powder which comprises mixing a sulfonated vegetable oil with an aqueous indigo paste, drying the mixture to substantial dryness, and grinding the resulting product to a powder.

11. A dye powder comprising an indigo dyestuff associated with a sulfonated vegetable oil.

12. A dye product comprising an indigo dyestuff associated with a sulfonated oil.

13. A process of preparing a dry indigo dyestuff composition which is capable of being readily wetted and dispersed in water, which comprises mixing a paste of an indigo dyestuff with a small amount of a sulfonated oil, compacting the product, and drying the resulting compacted product to substantial dryness.

14. A process of preparing a dry indigo powder which is capable of being readily wetted and dispersed in water, which comprises mixing an indigo paste with a small amount of Turkey red oil, pressing the product into cakes, drying the cakes to substantial dryness, and grinding the cakes to a powder.

In testimony whereof I affix my signature.

THEODORE L. MASTERSON.